No. 735,024. Patented July 28, 1903.

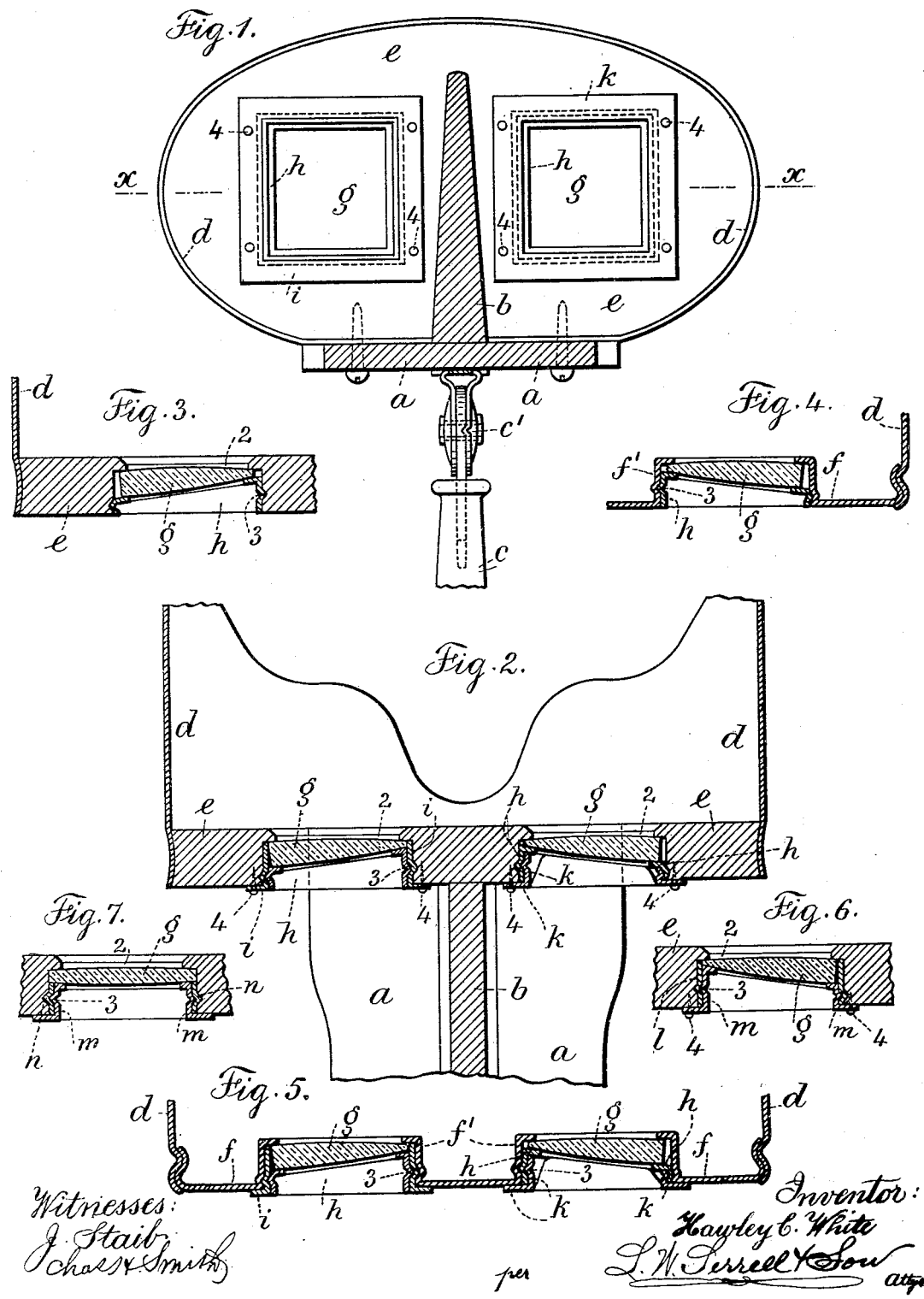

UNITED STATES PATENT OFFICE.

HAWLEY C. WHITE, OF NORTH BENNINGTON, VERMONT, ASSIGNOR TO H. C. WHITE COMPANY, OF NORTH BENNINGTON, VERMONT, A CORPORATION OF CONNECTICUT.

STEREOSCOPE.

SPECIFICATION forming part of Letters Patent No. 735,024, dated July 28, 1903.

Application filed October 6, 1902. Serial No. 126,030. (No model.)

*To all whom it may concern:*

Be it known that I, HAWLEY CASTLE WHITE, a citizen of the United States, residing at North Bennington, in the county of Bennington and State of Vermont, have invented an Improvement in Stereoscopes, of which the following is a specification.

My invention has special reference to a device or devices that are employed for holding the lenses in the lens-frame of a stereoscope. These means are adapted for use either with a wooden lens-frame or a metal lens-frame. They are, however, usually employed by me in connection with a wooden lens-frame. In the simpler form of the invention the lenses of the stereoscope are placed in lens-cavities provided therein and one side of each lens rests against a shoulder of the lens-frame, and I employ flanged frames of sheet metal fitting the lens-cavities, with the parallel portions thereof closely adjacent to the walls of said lens-cavities and with edge flanges which bear upon the opposite side of each lens and act to hold the lenses firmly in the cavities, and means are provided for holding the said flanged frames in the lens-cavities by connecting the same to the lens-frame. I may employ in connection with these frames other frames received within the lens-cavities and outside of said frames and which frames fit down within the cavities and at their bases surround the lenses. These perform the functions of not only centering the lenses in the cavities of the lens-frame, but steadying the same and preventing any shifting or displacement in the plane of the lenses. I may also employ modified arrangements of said frames.

In the drawings, Figure 1 is an elevation of the back of the lens-frame and a section of the shaft and septum. Fig. 2 is a sectional plan at the line $x\,x$ of Fig. 1. Fig. 3 is a partial horizontal section through a lens-frame of wood, showing the simpler form of the invention. Fig. 4 is a view similar to Fig. 3, showing the lens-frame of metal. Fig. 5 is a horizontal section showing the same construction as is shown in Fig. 2 applied to a metal lens-frame. Fig. 6 is a horizontal section showing a modified form of my invention; and Fig. 7 is a view similar to Fig. 6, showing another modified form of my invention.

$a$ represents the shaft of the stereoscope; $b$, the septum; $c$, a handle secured by a pivot-joint $c'$ to the shaft $a$. $d$ represents the hood, and $e$ the lens-frame. These parts are of usual and well-known construction.

In Figs. 4 and 5 I have illustrated the lens-frame $f$ as of metal, in which are stamped-up metal frames $f'$, forming the cavities or sockets for the lenses. In the lens-frame $e$ of wood the sockets for the lenses are usually formed in the shaping of the lens-frame by the arrangement of the pieces of wood constituting the same, said lens-frame of wood having flanges or ribs 2 of wood adjacent to the forward face, against which the said lenses bear at one face. Where a metal lens-frame is employed, similar ribs or flanges are provided at the free edges of the metal frames $f'$.

$g$ represents the lenses in the various sections in position. These lenses are of well-known form.

Figs. 3 and 4 represent the simpler form of my invention, in which a flanged frame $h$ of rectangular form and of a size adapted to fit within the lens-cavities is provided with flanges on two or more sides which bear against the surfaces of the lenses at their edges. In view of the peculiar form of these stereoscope-lenses said frame $h$ has one wide member, one narrow member, and two tapering members in order to fit the lens-cavities above the lenses and to have the edges of said members flush with the rear surface of the lens-frame. Any mechanical device may be employed for connecting the frames $h$ either to the wooden lens-frame $e$ or to the metal frames $f'$. I have shown slight projections 3, formed by the employment of a sharp center-punch making a conical depression in said frames at opposite sides and forcing the resultant projection into the material of the lens-frame. The frames $h$, as Figs. 3 and 4 show, are adapted equally well for a lens-frame of wood or of metal.

Flanged frames may be employed in modified forms without departing from my invention—that is, a frame $i$, as shown at the left-hand side of Figs. 2 and 5, may be employed with the frame $h$, in which case the frame $h$ is slightly smaller and the frame $i$ fits around the frame $h$ within the lens-cavity and down within said cavity and surrounds the periphery of the lens, the outer edge of said frame $i$ being flanged to sit over upon the back face of the lens-frame. This frame $i$ not only centers the lens $g$ and steadies the same in position, but prevents a looseness or movement of the lens in the same plane as the lens. The frame $i$, with a wooden lens-frame $e$, may be secured in place by tacks 4 and the frame $h$ secured in position with reference to the frame $i$, as well as both frames with reference to the lens-frame, by the employment of a center-punch, as hereinbefore described, producing the depressions and projections 3.

At the right hand of Figs. 2 and 5 I have shown a modified form of structure in which, in connection with a frame $h$, similar to the frames shown in Figs. 3 and 4, there is employed an outer frame $k$, fitting within the frame $h$ and having a flange at the outer edge extending over upon the back surface of the lens-frame, said frame being held to the lens-frame, Fig. 2, by tacks 4, and both frames, Figs. 2 and 5, held together and to the lens-frame, as hereinbefore described, by the action of a center-punch producing the depressions and projections 3.

In Fig. 6 I have shown a modification of my invention in which a frame similar to the frame $i$ is employed without a flange, this frame simply fitting within the lens-cavity, extending down within the same, and at the base thereof surrounding the lens for centering the same and preventing movement in the plane of the lens and in which the frame $m$, similar to the frame $h$, is formed with a second flange, which extends over and bears upon the back surface of the lens-frame and is secured by tacks 4 to the wooden lens-frame and both frames $l$ and $m$ together by depressions and projections 3 into the lens-frame.

In the modified form of my invention shown in Fig. 7 the lens $g$ completely fills the lens-cavity, with one surface bearing against the ribs 2. The frame $m$, as in Fig. 6, has two flanges, one bearing against the other side of the lens and the other flange against the back surface of the lens-frame. In this modification a frame $n$ is placed between the surface of the lens and the inner face of the outer flange of the frame $m$ and both frames are connected and held to the lens-frame by the depressions and resultant projections 3.

Although I have shown pins or tacks 4 for assisting in holding the metal frames to the lens-frame, I do not limit myself to their use, as probably under all circumstances the depressions and projections will be sufficient to not only hold the frames together, but to the lens-frame, and the said pins or tacks 4 or their equivalent (small screws) may be dispensed with.

These frames of metal are of inexpensive construction, they are light, they are readily applied and may be made to fit with great accuracy, and they are very efficient in holding the lenses of the stereoscope to the lens-frame.

I claim as my invention—

1. In a stereoscope, a lens-frame having lens-cavities each provided with an all-around edge rib against which the lenses bear upon one side, and flanged frames adapted to fit said lens-cavities and to bear against the opposite sides of said lenses and also against the walls of the cavities, and means for securing the flanges of said frames at said walls to said lens-frame.

2. In a stereoscope, a lens-frame having lens-cavities with edge ribs therein and against which ribs the lenses bear upon one side, and flanged frames with their outermost edges flush with the surface of the lens-frame adapted to fit said lens-cavities and to bear against the opposite sides of said lenses, and means for securing said frames to said lens-frame.

3. In a stereoscope, a lens-frame having lens-cavities with edge ribs therein and against which ribs the lenses bear upon one side, metal frames fitting down within said cavities and at their bases surrounding said lenses and flanged frames adapted to fit said lens-cavities and to bear against the opposite sides of said lenses, and means for securing said frames to said lens-frame.

4. In a stereoscope, a lens-frame having lens-cavities each provided with an all-around edge rib against which the lenses bear upon one side, and flanged metal frames in pairs adapted to fit said cavities, one pair to contact with the walls of the cavities and to surround the lenses at the bases of the cavities, and the other pair to bear upon the opposite sides of said lenses, and means for securing said frames to the lens-frame and so holding the lenses in place.

5. In a stereoscope, a lens-frame having lens-cavities each provided with an all-around edge rib against which the lenses bear upon one side, and flanged frames adapted to fit in said cavities and to take an all-around bearing against the opposite sides of said lenses and also against the walls of the cavities, and means for securing the flanges of said frames at said walls to said lens-frame.

6. In a stereoscope, a lens-frame having lens-cavities each provided with an all-around edge rib against which the lenses bear upon one side, and flanged metal frames adapted to fit each of said cavities, the one to contact with the walls of the cavities and the other frame to fit within the same and one of said frames to bear upon the opposite sides of said lenses, and holding means simultaneously connecting both frames together and also to the lens-frame.

7. In a stereoscope, a lens-frame having lens-cavities with integral edge ribs therein and against which the lenses bear upon one side, and flanged metal frames $h$ adapted to bear upon the opposite sides of said lenses, and a second frame concentric with the frame $h$ and having a flange extending over the surface of the lens-frame, and means for securing said frames together and to the lens-frame and so holding the lenses in place.

8. In a stereoscope, a lens-frame having lens-cavities with integral edge ribs therein and against which the lenses bear upon one side, flanged metal frames $h$ adapted to bear upon the opposite sides of said lenses and to fit the lens-cavities and contact with the walls thereof, and other frames concentric with the frames $h$ and fitting within the same and having flanges extending over the back surface of the lens-frame and means for securing said frames together and to the lens-frame and so holding the lenses in place.

Signed by me this 1st day of October, 1902.

HAWLEY C. WHITE.

Witnesses:
EMILY SCOTT,
FRANKLIN SCOTT.